United States Patent
Cleary et al.

(10) Patent No.: US 11,220,337 B2
(45) Date of Patent: Jan. 11, 2022

(54) NON-EXPLOSIVE STRAP CUTTER FOR PAYLOAD RELEASE

(71) Applicant: THE BOEING COMPANY, Chicago, IL (US)

(72) Inventors: William Worden Cleary, Everett, WA (US); Ty Aaby Larsen, Everett, WA (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 16/595,347

(22) Filed: Oct. 7, 2019

(65) Prior Publication Data

US 2021/0101681 A1 Apr. 8, 2021

(51) Int. Cl.
*B64D 1/12* (2006.01)
(52) U.S. Cl.
CPC .................................... *B64D 1/12* (2013.01)
(58) Field of Classification Search
CPC .... B64D 1/12; B26D 7/26; B26D 2007/2685; Y10T 83/8782; Y10T 83/8784
See application file for complete search history.

(56) References Cited

U.S. PATENT DOCUMENTS

| 3,393,605 | A | * | 7/1968 | Parnell | F42B 3/006 89/1.14 |
| 3,854,356 | A | * | 12/1974 | Okreglak | B26D 5/26 83/66 |
| 5,465,490 | A | * | 11/1995 | Smith | A62B 3/005 30/180 |
| 5,603,470 | A | * | 2/1997 | Fitzgerald | B63B 21/60 119/242 |
| 8,387,501 | B2 | * | 3/2013 | Jordan | B26D 1/08 83/586 |
| 2010/0257983 | A1 | * | 10/2010 | Jordan | B26D 1/08 83/13 |
| 2013/0082145 | A1 | * | 4/2013 | Dorris, III | B64D 1/10 244/137.1 |

FOREIGN PATENT DOCUMENTS

EP 0198805 A1 * 10/1986 ............... B63C 9/22

* cited by examiner

*Primary Examiner* — Joseph W Sanderson
(74) *Attorney, Agent, or Firm* — Womble Bond Dickinson (US) LLP

(57) ABSTRACT

An apparatus for cutting a cutting a payload strap includes a cutting assembly with an aperture to enclose a payload strap and a cutting element to sever the payload strap, a non-explosive energy source to store cutting energy, a control component coupled to the energy source to release the cutting energy, and a controller coupled to the control component to time and control the delivery of the cutting energy to the cutting element.

20 Claims, 12 Drawing Sheets

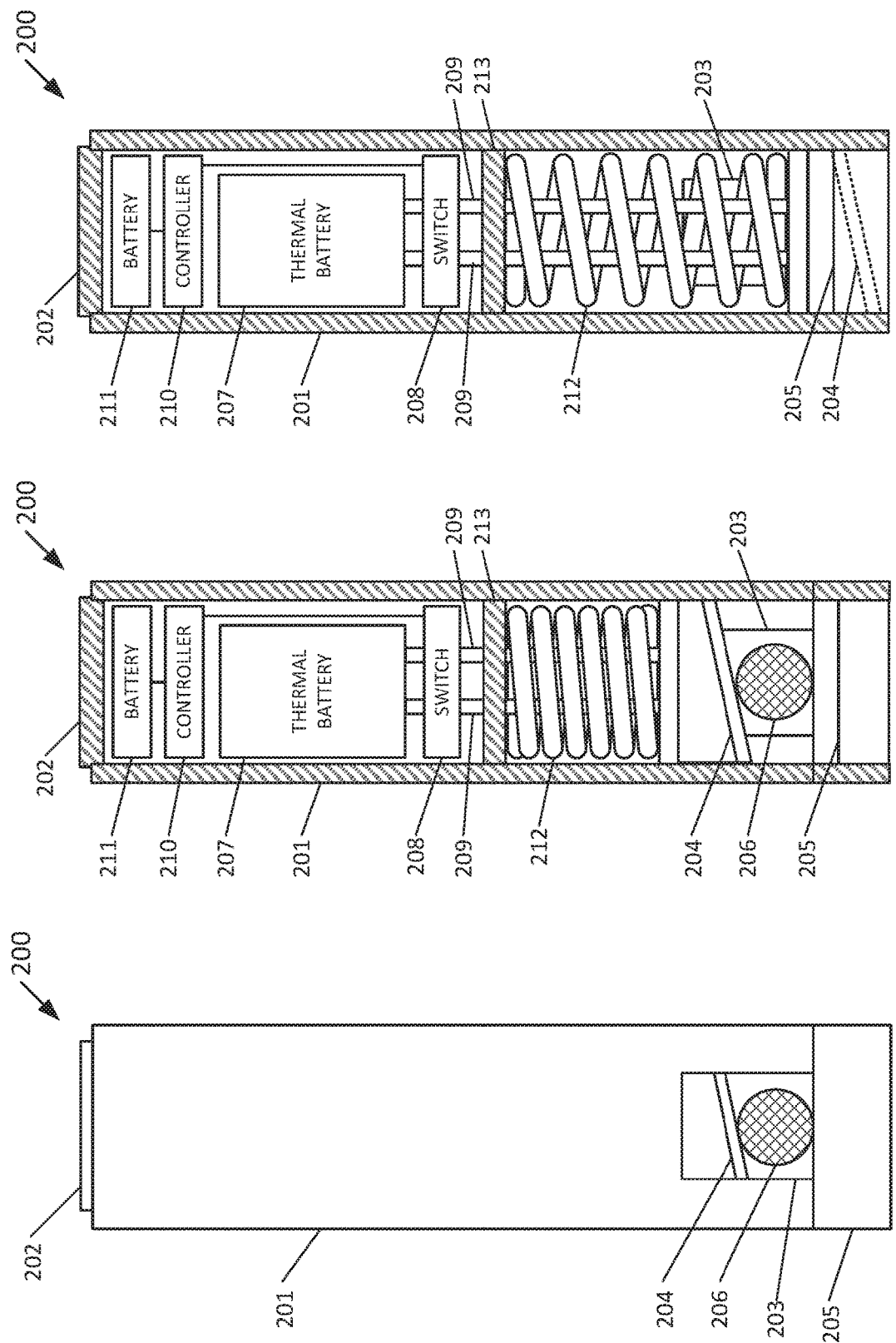

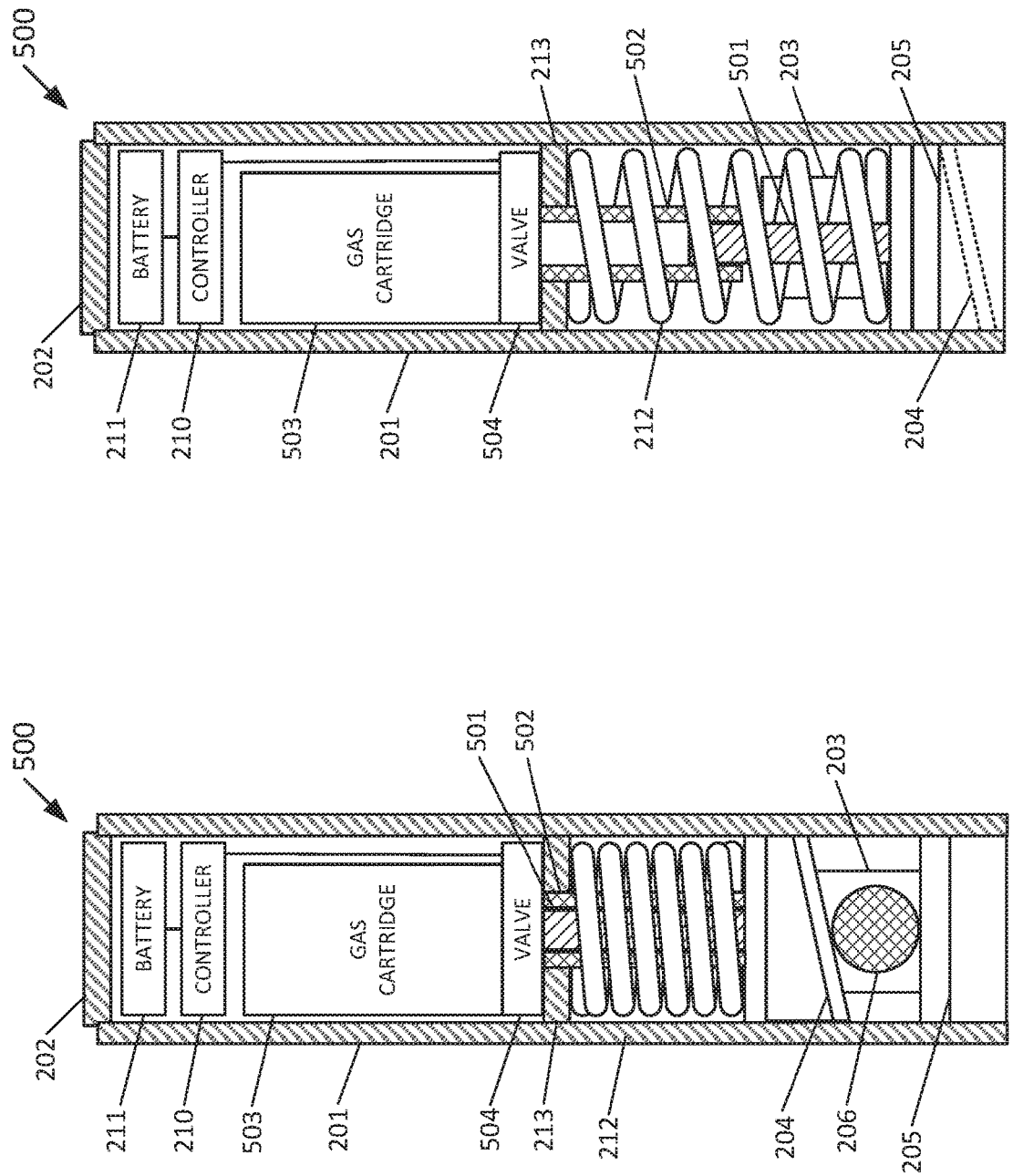

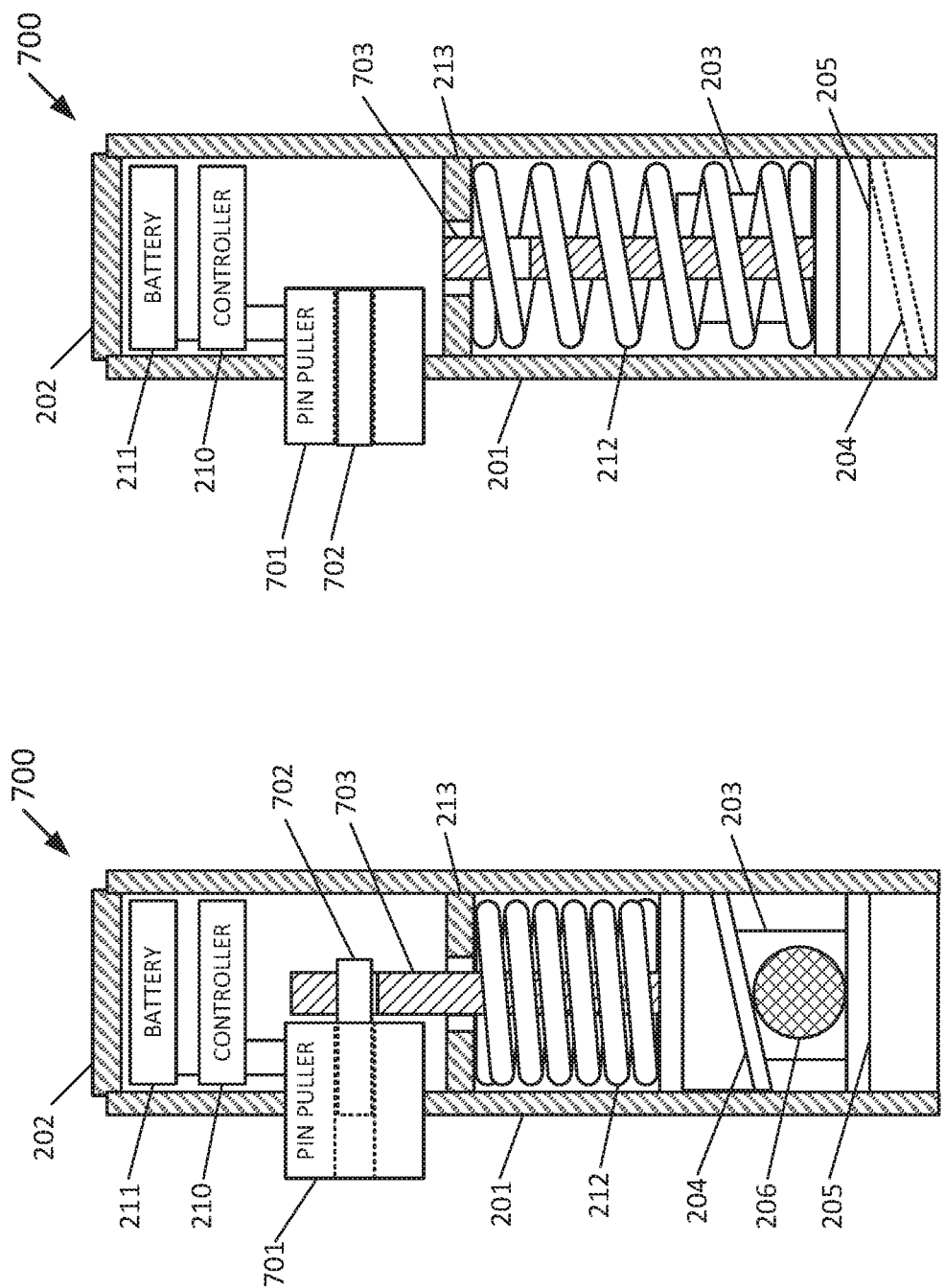

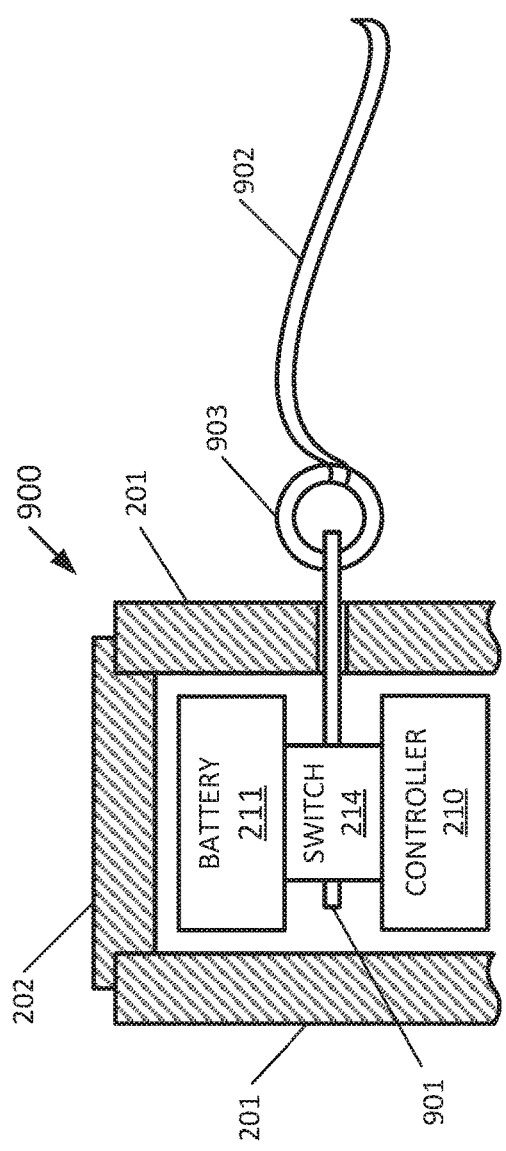
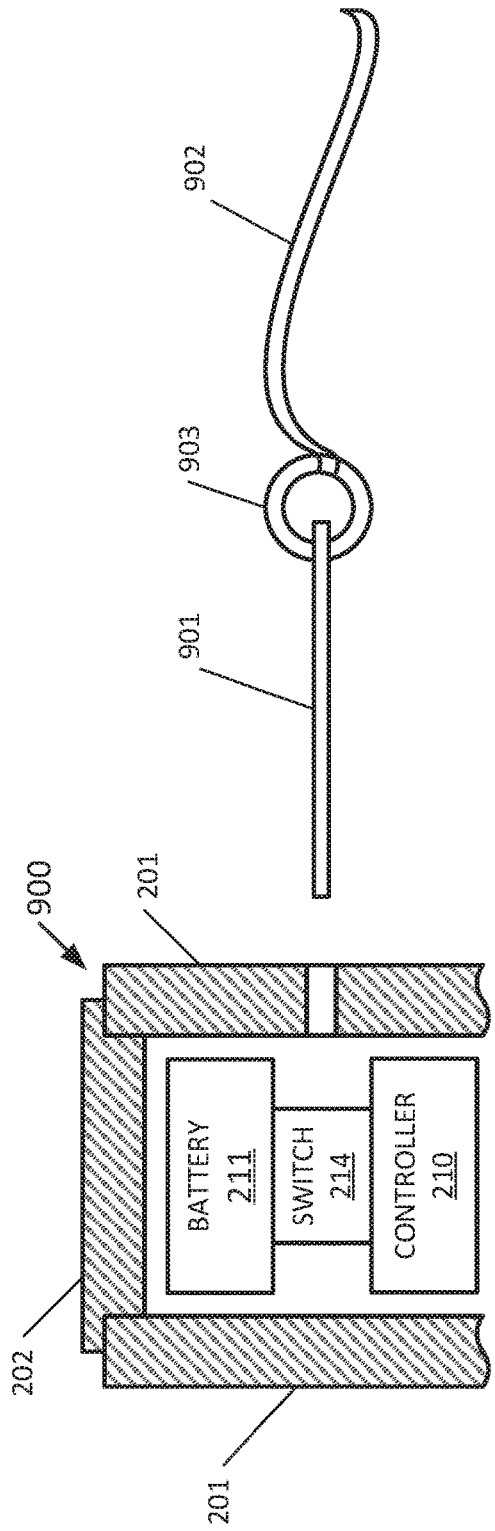

NON-EXPLOSIVE STRAP CUTTER FOR PAYLOAD RELEASE

FIELD

The present disclosure is related to airborne payload release systems in general and, in particular, to the release of airborne payloads with non-explosive payload strap cutting devices.

BACKGROUND

Payloads for airborne delivery are typically netted and strapped to contain the payload for a predetermined period of time after deployment, when a time-fused explosive device is used to cut the strapping and release the contents of the payload. This scenario is typical, for example, in aerial firefighting, where the payload consists of frangible water containers that are released when the time-fused explosive device detonates to cut the payload strapping. However, this approach has proven to be inaccurate and even unsafe.

Existing systems depend on the real-time selection of fuse timing, and conformance to a flight plan that places the payload release at a time and location that will insure its delivery to a target location. Any unplanned variation from the flight plan or misjudgment in selecting the fuse timing can cause the payload to miss its target.

The use of explosives to cut the payload strapping also raises safety risks. Premature detonation of the explosive device, while the payload is still within the aircraft, could jeopardize human safety, and result in the ineffective deployment of the payload after it leaves the aircraft.

SUMMARY

The present disclosure describes examples of apparatus and methods for the release and deployment of airborne payloads using a non-explosive payload strap cutter.

In one example, an apparatus for cutting a payload strap (or straps) includes a cutting assembly with an aperture to enclose the payload strap and a cutting element to sever the payload strap, a non-explosive energy source to store cutting energy, a control component coupled to the energy source to release the cutting energy, and a controller coupled to the control component to time and control the delivery of the cutting energy to the cutting element.

In one example, the cutting element is a blade, the energy source is a thermal battery, and the control component is a switch coupled between the thermal battery and the blade, where the apparatus also includes a spring to preload the blade against the payload strap, and where the controller is configured to time and control the switch to deliver heating current from the thermal battery to the cutting element to melt through the payload strap.

In one example, the cutting element is a wire loop enclosing the payload strap, the energy source is a thermal battery, and the control component is a switch coupled between the thermal battery and the wire loop, where the apparatus also includes a spring to pretension the wire loop around the payload strap, and where the controller is configured to time and control the switch to deliver heating current from the thermal battery to the wire loop to melt through the payload strap.

In one example, the cutting element is a blade coupled to a piston, the energy source is a cartridge of compressed gas, and the control component is a valve coupled between the cartridge and the piston, where the apparatus also includes a spring to bias the blade away from the payload strap, and where the controller is configured to time and control the valve to release the compressed gas to drive the piston and the blade to cut the payload strap.

In one example, the cutting element is a blade, the energy source is a compressed spring, and the control component is a pin ejector, where a pin of the pin ejector is coupled to the blade, where the compressed spring is disposed around the pin between the blade and the body of the pin ejector, and where the controller is configured to time and control the release of the pin to deliver the energy of the compressed spring to the blade, to cut the payload strap.

In one example, the cutting element comprises a blade, the energy source comprises a compressed spring disposed between the blade and a bulkhead, and the control component comprises a pin puller, where a pin of the pin puller is coupled to the blade to restrain the blade against the stored energy of the compressed spring, and where the controller is configured to time and control the pin puller to release the blade and to deliver the stored energy of the compressed spring to the cutting element to cut the payload strap.

In one example, the cutting element is a blade, the energy source is a thermal battery, and the control component is a phase change actuator coupled with the thermal battery and the controller, where a pin of the phase change actuator is coupled with the blade, and where the controller is configured to time and control a connection between the thermal battery and the phase change actuator to eject the pin to deliver the energy from the phase change actuator to the cutting element to cut the payload strap.

In one example, the apparatus includes a wireless transceiver to receive timing instructions for cutting the payload strap from a remote server, where the timing instructions are based on a current location, altitude and velocity of the payload, and a target location, altitude and velocity for deployment of the payload.

In one example, the apparatus also includes a GPS receiver to detect a current location, altitude and velocity of the payload where the wireless transceiver is configured to transmit the current location, altitude and velocity of the payload and to receive a target location, altitude and velocity of the payload for deployment of the payload, and where the controller is configured to cut the payload strap when the current location, altitude and velocity match the target location altitude and velocity within a predefined accuracy.

In one example, the target location, altitude and velocity are received from a remote server in one of the payload aircraft, an observation aircraft, and a ground-based command and control center.

In one example, the apparatus is manually activated by the removal of an activation pin attached to a drogue line when the payload is ejected from the payload aircraft.

In one example, a method according to the present disclosure includes enclosing a payload strap in a cutting assembly, where the cutting assembly includes an aperture and a cutting element, timing and controlling the delivery of cutting energy to the cutting element with a controller and a control component, delivering the cutting energy from a non-explosive energy source to the cutting element, and severing the payload strap with the cutting element.

BRIEF DESCRIPTION OF THE DRAWINGS

For a more complete understanding of various examples, reference is now made to the following detailed description taken in connection with the accompanying drawings in which like identifiers correspond to like elements:

FIG. 2A illustrates an example payload strap cutter before payload deployment;

FIG. 2B is an internal view of an example payload strap cutter before payload deployment;

FIG. 2C is an internal view of the example payload strap cutter of FIG. 2B after payload deployment;

FIG. 5A is an internal view of another example payload strap cutter before payload deployment;

FIG. 5B is an internal view of the example payload strap cutter of FIG. 5A after payload deployment;

FIG. 7A is an internal view of another example payload strap cutter before payload deployment;

FIG. 7B is an internal view of the example payload strap cutter of FIG. 7A after payload deployment;

FIGS. 9A and 9B illustrate a method of manual activation of the example payload strap cutters of FIGS. 2A, 4A, 5A, 6A, 7A and 8A;

DETAILED DESCRIPTION

The present disclosure describes examples of apparatus and methods for releasing a payload from an aircraft deployed cargo pod using a non-explosive device to cut the straps that confine the payload within the cargo pod. Examples of such deployment include, without limitation, the dispersion of frangible water containers for aerial firefighting and the distribution of emergency supply packages after natural disasters.

Figure 1A:
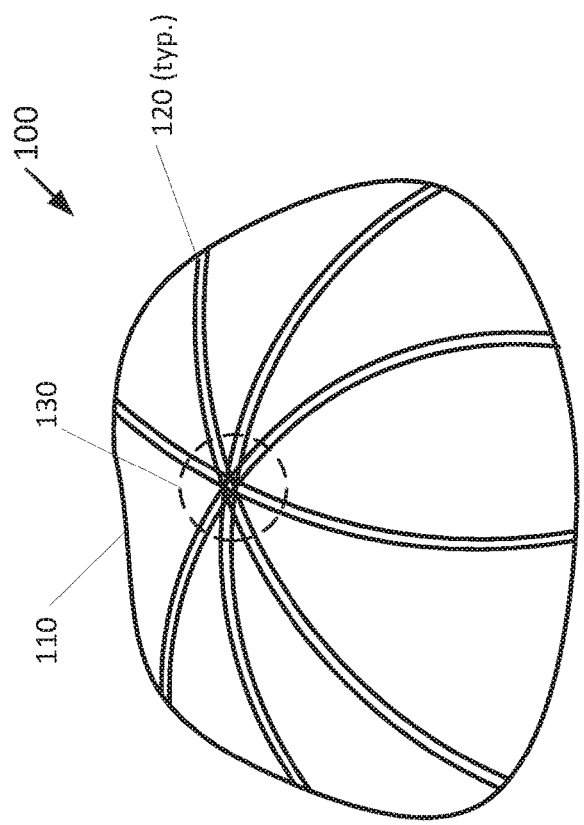
FIG. 1A illustrates an example payload according to the present disclosure.

FIG. 1A illustrates an example of a cargo pod 100. Cargo pod 100 may include a cargo netting 110 to enclose cargo such as the above referenced water containers or emergency supply packages, and one or more cargo straps 120 to conform the cargo netting to the payload. As illustrated in FIG. 1A, the cargo straps 120 may be configured to overlap at a location 130 where a cutter can be placed to cut all of the straps in one cutting operation to release the payload after the cargo pod exits the payload aircraft.

Figure 1B:
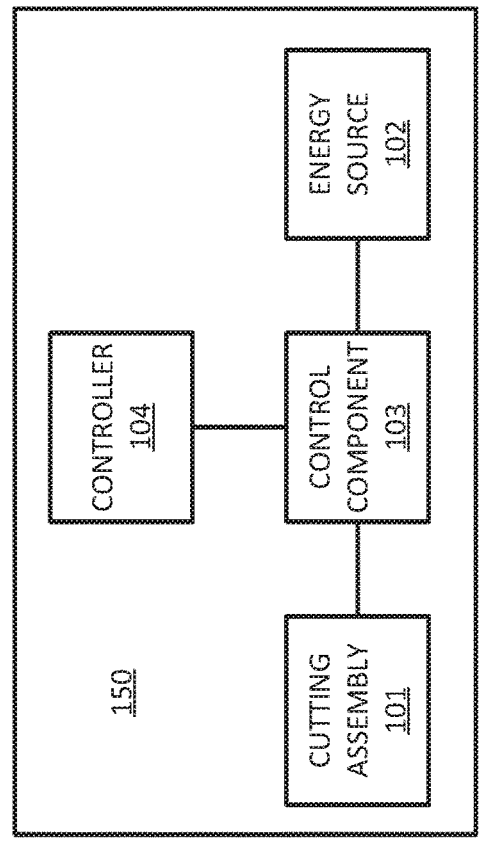
FIG. 1B is a block diagram of an example cutter apparatus.

FIG. 1B is a block diagram of an example cutter apparatus 150 that can be placed at location 130 of the cargo pod 100, to time and control the cutting of the payload straps 120 to achieve a desired distribution of the payload over a defined target area. In one example, cutter apparatus 150 includes a cutting assembly 101 with an aperture to enclose the payload straps 120 and a cutting element to sever the payload straps 120. Cutter apparatus 150 also includes a non-explosive (i.e., non-pyrotechnic) energy source 102 to store cutting energy for transfer to the cutting element. Cutter apparatus 150 also includes a control component 103 coupled to the energy source to control the release the cutting energy. Cutter 150 also includes a controller 104, coupled with the control component 103 to time and control the delivery of the cutting energy to the cutting element.

FIG. 2A illustrates an example payload strap cutter (cutter) 200 showing a cylindrical body 201, a cap 202, an aperture 203, a blade 204, and a removable blade receiver (receiver) 205, with a payload strap 206 threaded through the aperture 203.

FIG. 2B is an internal view of example cutter 200 before payload deployment. As illustrated in FIG. 2B, the cutting element is the blade 204, the energy source is a thermal battery 207, and the control component is a switch 208 coupled between the thermal battery 207 and the blade 204 by conductors 209. Cutter 200 also includes a controller 210 with internal memory, coupled to the switch 208, to time and control the operation of the switch 208, and a battery 211 to power the controller 210. Cutter 200 also includes a spring 212, in compression, between a bulkhead 213 and the blade 204. The spring 212 is configured to preload the blade against the payload strap 206 with enough force to pin the payload strap 206 between the blade 204 and the receiver 210, but not enough force to cut the payload strap 206.

When cutter 200 is activated (to be described in detail below), the controller 210 operates as a countdown timer for a programmed time period. When the time is expired, the controller closes the switch 208 to connect the thermal battery 207 to the blade 204 via the conductors 209. The blade 204 is metallic and short circuits the thermal battery 207. The thermal battery 207 is designed to have a low internal resistance and is capable of providing a large current over a short period of time. This current flows through the blade 204 and rapidly heats the blade. This rapid heating melts the payload strap 206, which is made of a plastic, such as nylon for example. As the payload strap 206 melts, the spring 212 pushes the blade 204 through the payload strap 206 until the strap is severed. This post-deployment condition is illustrated in FIG. 2C, where the spring 212 has expanded and pushed the blade 204 all the way into the receiver 205.

Figure 3D:
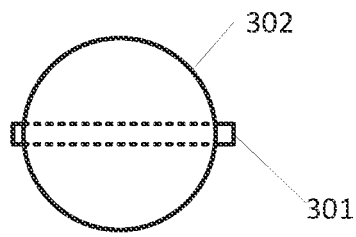
FIGS. 3A through 3J are various examples of cutting elements.
Figure 3A:
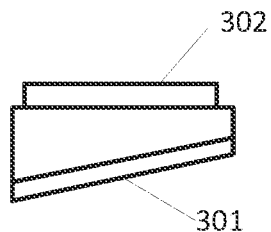
Figure 3B:
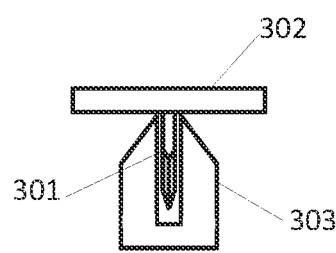
Figure 3C:
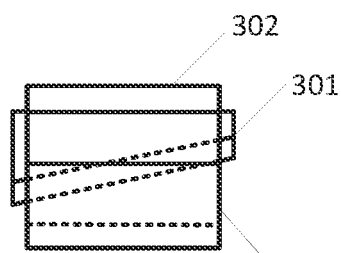

FIGS. 3A through 3J illustrate several examples of blades that may be used in cutter 200 or other cutters to be described in detail below. FIG. 3A is a front view of a guillotine blade 301 similar to blade 204 in FIG. 2B, with a circular top piece 302 (see FIG. 3D) to fit within the cylindrical body 201 of cutter 200 and provide a platform for spring 212. As illustrated in FIG. 3A, the ends of blade 301 extend beyond the diameter of the top piece 302 so that the blade can ride in slots (not shown) in the inner wall of cylindrical body 201. FIG. 3B is a side view of blade 301 engaged with a blade receiver 303, similar to receiver 205 in FIG. 2C, and FIG. 3C is a front view of blade 301 engaged with receiver 303. FIG. 3D is a top view of FIG. 3A illustrating the circular top piece 302.

Figure 3E:
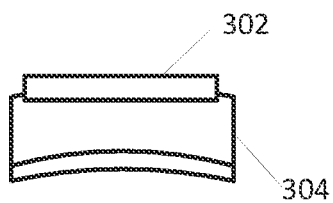
Figure 3F:
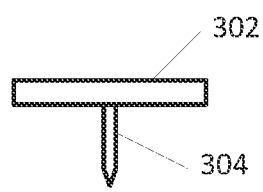
Figure 3G:
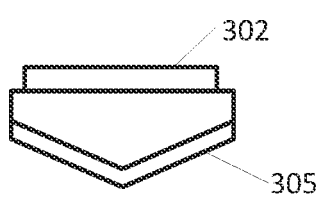
Figure 3H:
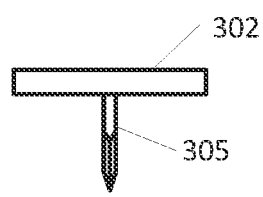
Figure 3I:
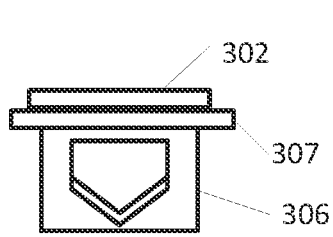
Figure 3J:
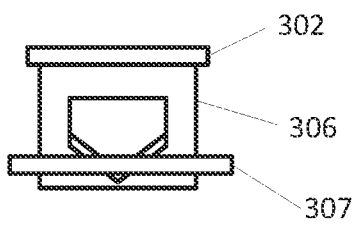

Other blade shapes may be used depending on the type and shape of the payload strap (or straps). FIGS. 3E and 3F illustrate front and side views of a concave blade 304, FIGS. 3G and 3H illustrate a pointed blade 305, and FIGS. 3I and 3J illustrate two views of a V-blade 306, with upward facing blade edges, designed to be pulled up through a slotted rib 307 to sever a payload strap.

Figure 4B:
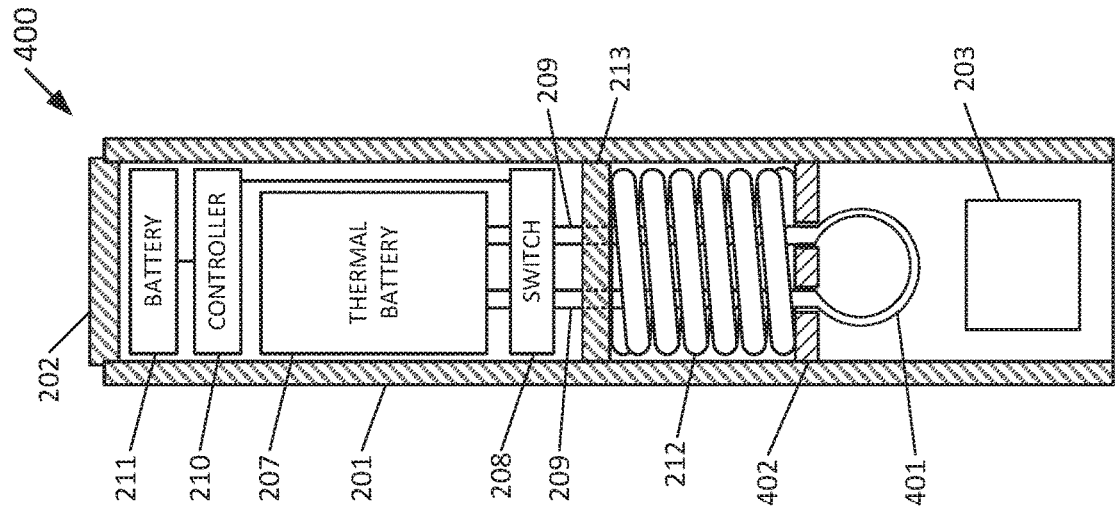
FIG. 4B is an internal view of the example payload strap cutter of FIG. 4A after payload deployment.
Figure 4A:
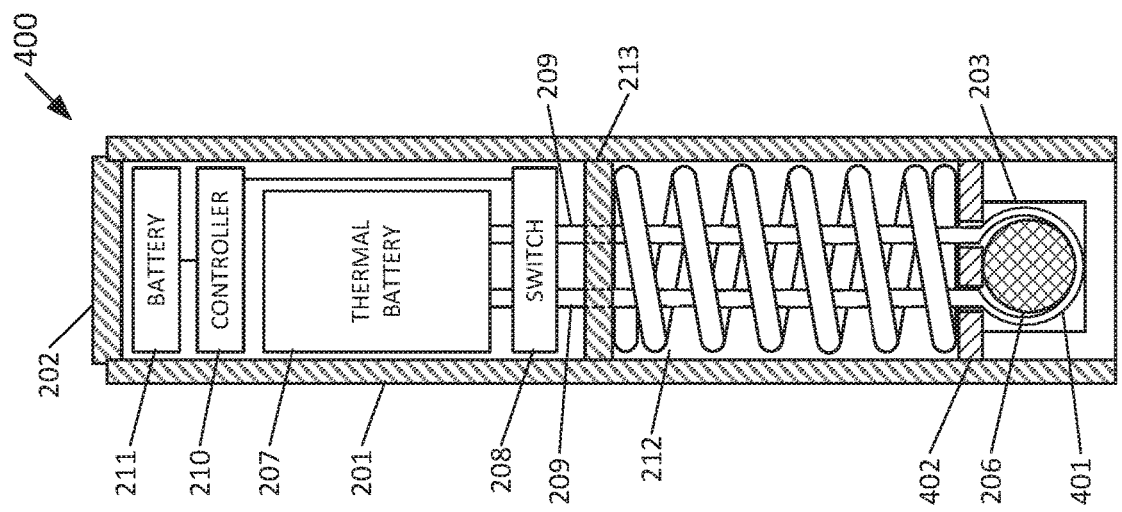
FIG. 4A is an internal view of another example payload strap cutter before payload deployment.

FIG. 4A illustrates an internal view of an example cutter 400 in a pre-deployment configuration. Cutter 400 is similar in many respects to cutter 200, having a cylindrical body 201, a cap 202, and an aperture 203. Instead of a blade and receiver, however, cutter 400 includes a wire loop 401 as the cutting element, mounted to an insulating disk 402 that is attached to spring 212. Spring 212 is expanded between bulkhead 213 and insulating disk 402, and preloads the wire loop 401 against the payload strap 206, which is restrained by aperture 203. Cutter 400 also includes a thermal battery 207 as the energy source, a switch 208 as the control component, coupled between the thermal battery 207 and the wire loop 401 by conductors 209.

When cutter 400 is activated, the controller 210 operates as a countdown timer for a programmed time period. When the time is expired, the controller closes the switch 208 to connect the thermal battery 207 to the wire loop 401 via the conductors 209. The wire loop 401 is metallic and short circuits the thermal battery 207. Current from the thermal battery flows through the conductors 209 and rapidly heats the wire loop 401. This rapid heating melts the payload strap 206. As the payload strap 206 melts, the spring 212 pulls the wire loop 401 through the payload strap 206 until the strap is severed. FIG. 4B illustrates the internal configuration of cutter 400 after the payload strap has been severed.

FIG. 5A illustrates another example cutter 500 in a pre-deployment configuration. Cutter 500 has many components in common with cutter 200 and cutter 400, which are labeled in FIG. 5A, but not described here to avoid unnecessary repetition. In FIG. 5A, the cutting element is blade 204 coupled with a piston 501. The piston 501 resides within a cylinder 502 that is mounted through bulkhead 213. The energy source is a cartridge of compressed gas 503 (e.g. $CO_2$ or nitrogen), and the control component is a valve 504 coupled between the cartridge 503 and the cylinder 502. Cutter 500 also includes a spring 212 to bias the blade 204 away from the payload strap.

When cutter 500 is activated, the controller 210 operates as a countdown timer for a programmed time period. When the time is expired, the controller 210 is configured open the valve 504 to release the compressed gas from the gas cartridge 503. The expanding gas overcomes the force of the spring 212, and drives the piston 501 and the blade 204 to cut the payload strap 201.

FIG. 5B illustrates the internal configuration of cutter 500 after the payload strap has been severed, where the blade has been captured by the receiver. In other examples, the force of the spring 212 may be enough to return the piston 501 and the blade 204 to their starting positions.

Figure 6A:
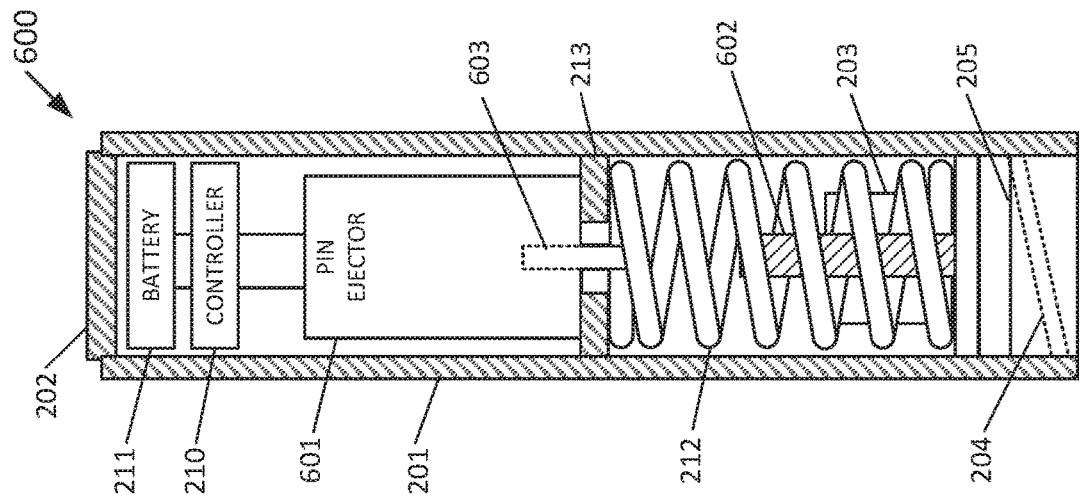
FIG. 6A is an internal view of another example payload strap cutter before payload deployment.

FIG. 6A is an internal view of an example cutter 600. Again, elements already described and discussed with respect to earlier examples are labeled accordingly but not described again in detail to avoid unnecessary repetition. In FIG. 6A, the cutting element is the blade 204, the energy source is compressed spring 212, and the control component is pin ejector 601. Pin ejector 601 may be, for example (and without limitation) a TiNi Aerospace ERM E250 pin ejector or the like. As illustrated in FIG. 6A, a pin 602 is coupled with an internal pin 603 of pin ejector 601, and is also attached to the blade 204. The compressed spring 212 is disposed around the pin 602 between the pin ejector 601 and the blade 204. Battery 211 supplies power to the pin ejector 601, and controller 210 is configured to time and control the release of the pin 602.

Figure 6B:
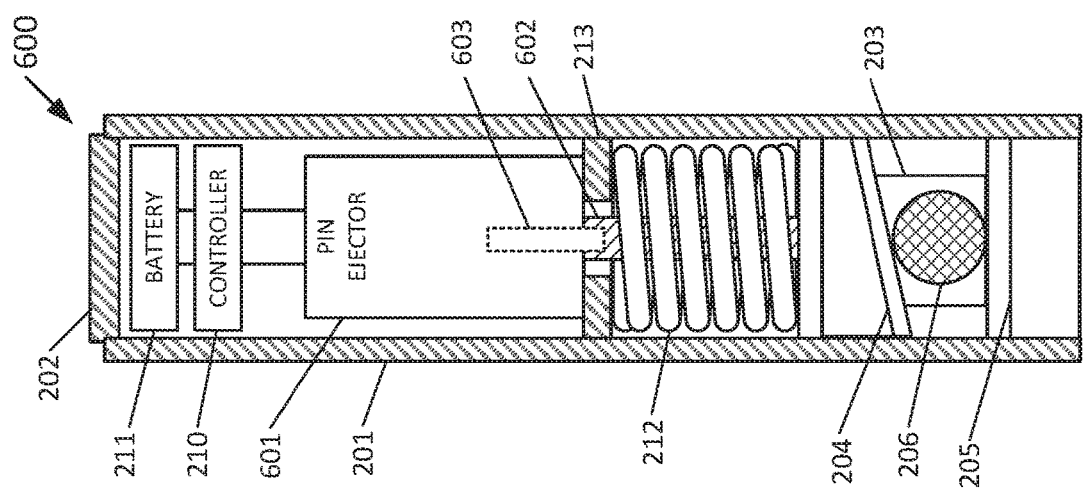
FIG. 6B is an internal view of the example payload strap cutter of FIG. 6A after payload deployment.

When cutter 600 is activated, the controller 210 operates as a countdown timer for a programmed time period. When the time is expired, the controller triggers the pin ejector to release the pin 602, which allows the stored energy of the compressed spring 212 to be delivered to the blade 204 to cut the payload strap 206. FIG. 6B illustrates the internal configuration of cutter 600 after the payload strap has been severed.

FIG. 7A is an internal view of an example cutter 700. Again, elements already described and discussed with respect to earlier examples are labeled accordingly but not described again in detail to avoid unnecessary repetition. In FIG. 7A, the cutting element is the blade 204, the energy source is the compressed spring 212, and the control component is a pin puller 701, which may be, for example (and without limitation), a TiNi Aerospace P5 pin puller or the like. As illustrated in FIG. 7A, a pin 702 of the pin puller 701 is engaged with a rod 703 that is coupled to the blade 204 through the bulkhead 213. The compressed spring 212 is disposed around the rod 703 between the bulkhead 213 and the blade 204. The pin 702 restrains the blade 204 against the stored energy of the compressed spring 212. Battery 211 supplies power to the pin puller 701, and controller 210 is configured to time and control the operation of pin puller 701.

When cutter 700 is activated, the controller 210 operates as a countdown timer for a programmed time period. When the time is expired, the controller 210 triggers the pin puller 701 to retract the pin 702 into the body of the pin puller 701, which releases the rod 703 and allows the stored energy of the compressed spring 212 to be delivered to the blade 204 to cut the payload strap 206. FIG. 7B illustrates the internal configuration of cutter 600 after the payload strap has been severed.

Figure 8B:
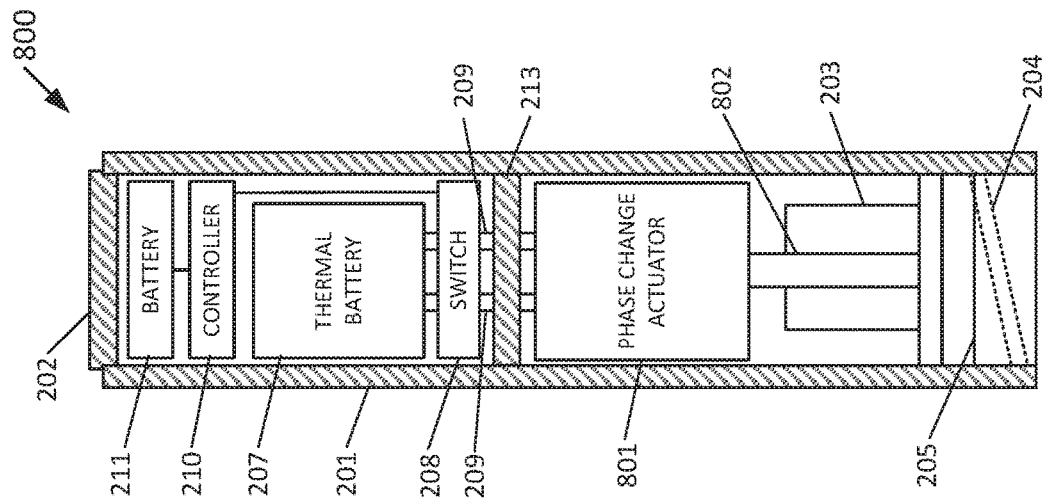
FIG. 8B is an internal view of the example payload strap cutter of FIG. 8A after payload deployment.
Figure 8A:
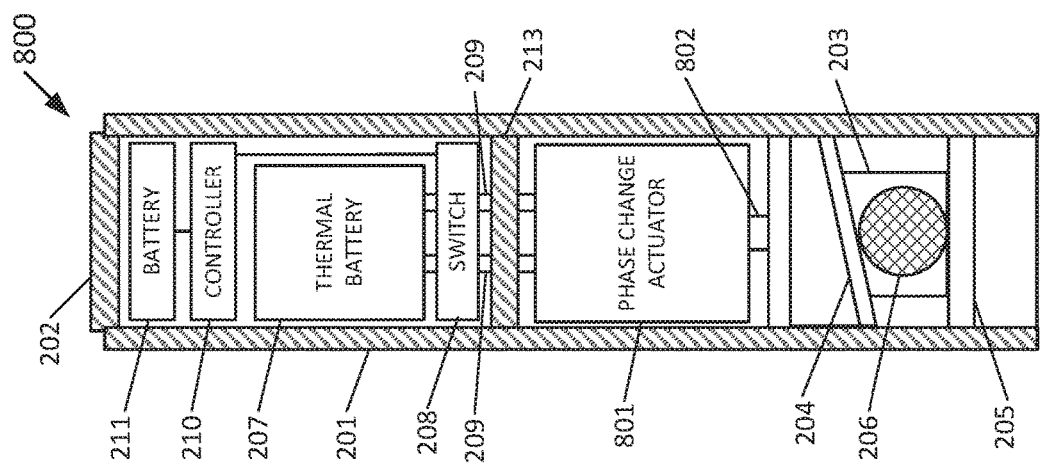
FIG. 8A is an internal view of another example payload strap cutter before payload deployment.

FIG. 8A is an internal view of an example cutter 800. Elements already described and discussed with respect to earlier examples are labeled accordingly but not described again in detail to avoid unnecessary repetition. In FIG. 8A, the cutting element is the blade 204, the energy source is the thermal battery 207, and the control component is a switch 208 coupled between the thermal battery 207 and a phase change actuator 801 by conductors 209. Phase change actuators are devices that rely on a material phase change, either a solid to liquid phase change or a liquid-to-gas phase change, to perform mechanical work. As illustrated in FIG. 7A, a pin 802 of the phase change actuator 801 is coupled to the blade 204 through the bulkhead 213.

When cutter 800 is activated, the controller 210 operates as a countdown timer for a programmed time period. When the time is expired, the controller 210 closes the switch 208 to connect the thermal battery 207 with the phase change actuator. Current from the thermal battery is applied to heating coils in the phase change actuator 801, and the heating coils change the phase of the material in the phase change actuator 801, increasing the internal pressure and ejecting the pin 802 from phase change actuator 801 to drive the blade 204 through payload strap 206. FIG. 7B illustrates the internal configuration of cutter 800 after the payload strap has been severed.

FIGS. 9A and 9B illustrate a possible configuration 900 for activating any of example cutters 200, 400, 500, 600, 700 and 800. FIGS. 9A and 9B include the cylindrical housing 201, cap 202, controller 210 and battery 211, common to all of the previously described cutters. As illustrated in FIG. 9A, a switch 214 may be interposed between the battery 211 and the controller 210 that is held open by a pin 901. Pin 901 may be attached to a drogue line 902 by a ring 903. As illustrated in FIG. 9B, the pin 901 may be pulled out of switch 214 by the drogue line 902, which is tethered to the payload aircraft, when the cargo pod (e.g., cargo pod 100) is ejected from the payload aircraft, closing the switch 214 and applying battery power to controller 210 to start the programmed timing period.

As previously described, a fixed timing approach for payload release, after a cargo pod is ejected from a payload aircraft, may not yield satisfactory results if the payload aircraft has been forced to deviate from a predetermined flight plan, for example by current weather conditions, current ground conditions, or safety concerns. Accordingly, it would be advantageous to have the capability to adapt the timing of payload release in real time.

Figure 10:
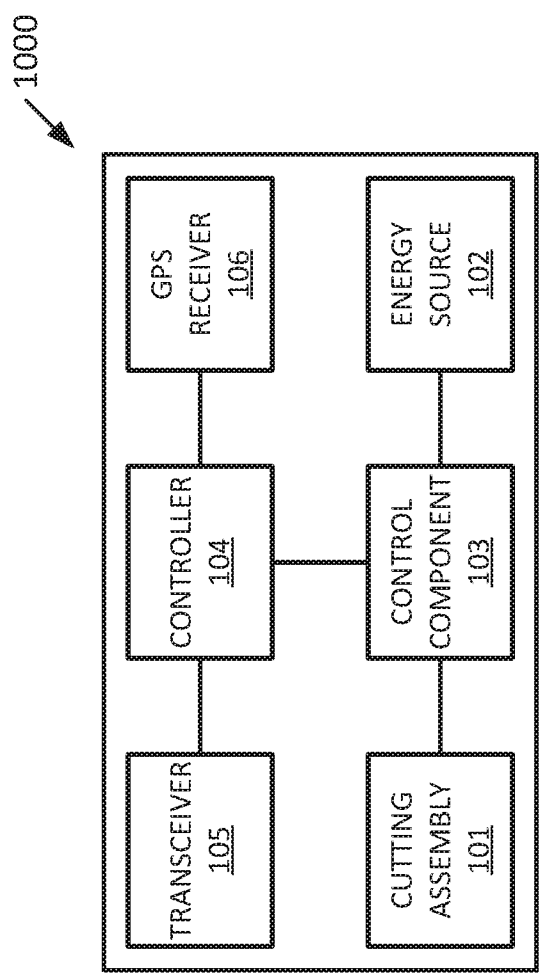
FIG. 10 is a block diagram of a payload strap cutter configured with a wireless transceiver and a GPS receiver.

FIG. 10 is a block diagram of an example cutter apparatus 1000. Bock diagram 1000 includes a wireless transceiver 105 to receive timing instructions for cutting the payload strap 206 from a remote server, where the timing instructions are based on a current location, altitude and velocity of the payload 100 known by the server (e.g., by means of radar telemetry), and a target location, altitude and velocity for deployment of the payload 100 known by the server. Block diagram 1000 also includes a GPS receiver 106 to detect the current location, altitude and velocity of the payload, where the wireless transceiver 105 is configured to transmit the current location, altitude and velocity of the payload 100 and to receive a target location, altitude and velocity of the payload 100 for deployment of the payload 100, and where the controller 210 is configured to cut the payload strap 206 when the current location, altitude and velocity of the payload 100 match the target location altitude and velocity with a predefined accuracy. In one example, the target location, altitude and velocity of the payload 100 are received from one of the payload aircraft, an observation aircraft, and a ground-based control and command center.

Figure 11:
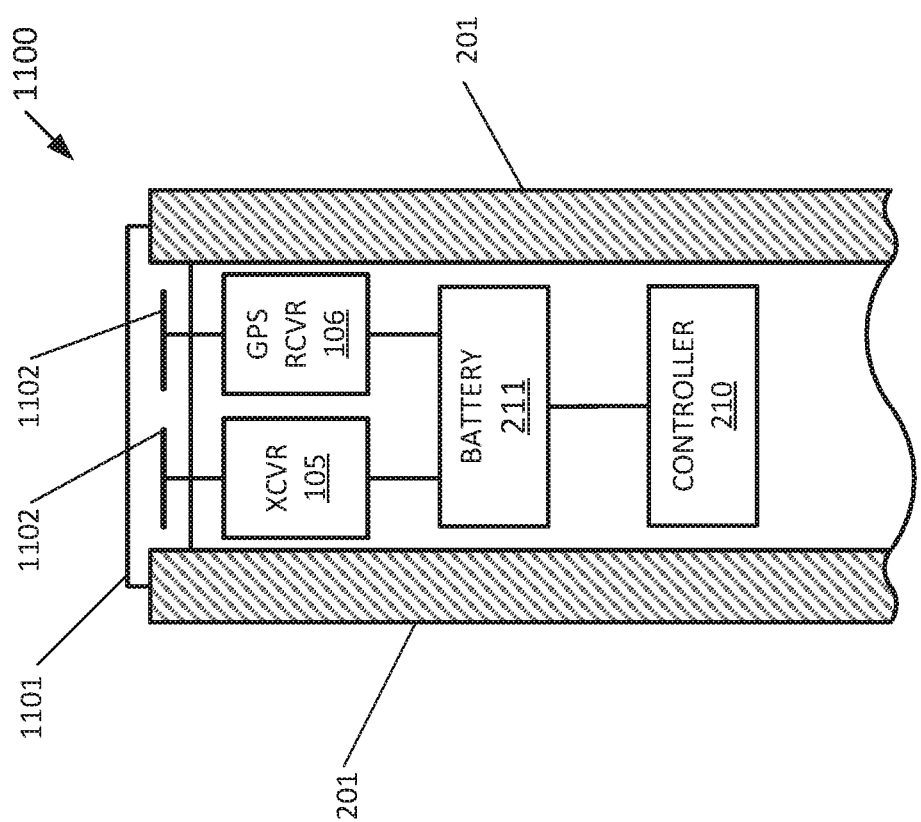
FIG. 11 is a partial view of an example payload strap cutter incorporating a wireless transceiver and a GPS receiver.

FIG. 11 is a partial cross-section of an example cutter 1100 incorporating the transceiver (xcvr) 105 and the GPS receiver (rcvr) 106 as described above. To facilitate RF communications with the transceiver 105 and the GPS receiver 106, cap 202 of the previous example cutter may be replaced with a radio frequency transparent cap 1101 with embedded patch antennas 1102 and 1103, connected respectively to transceiver 105 and GPS receiver 106. Alternatively, the patch antennas 1105 and 1106 may be printed on the interior or exterior surfaces of cap 1101 (not shown).

Figure 12:
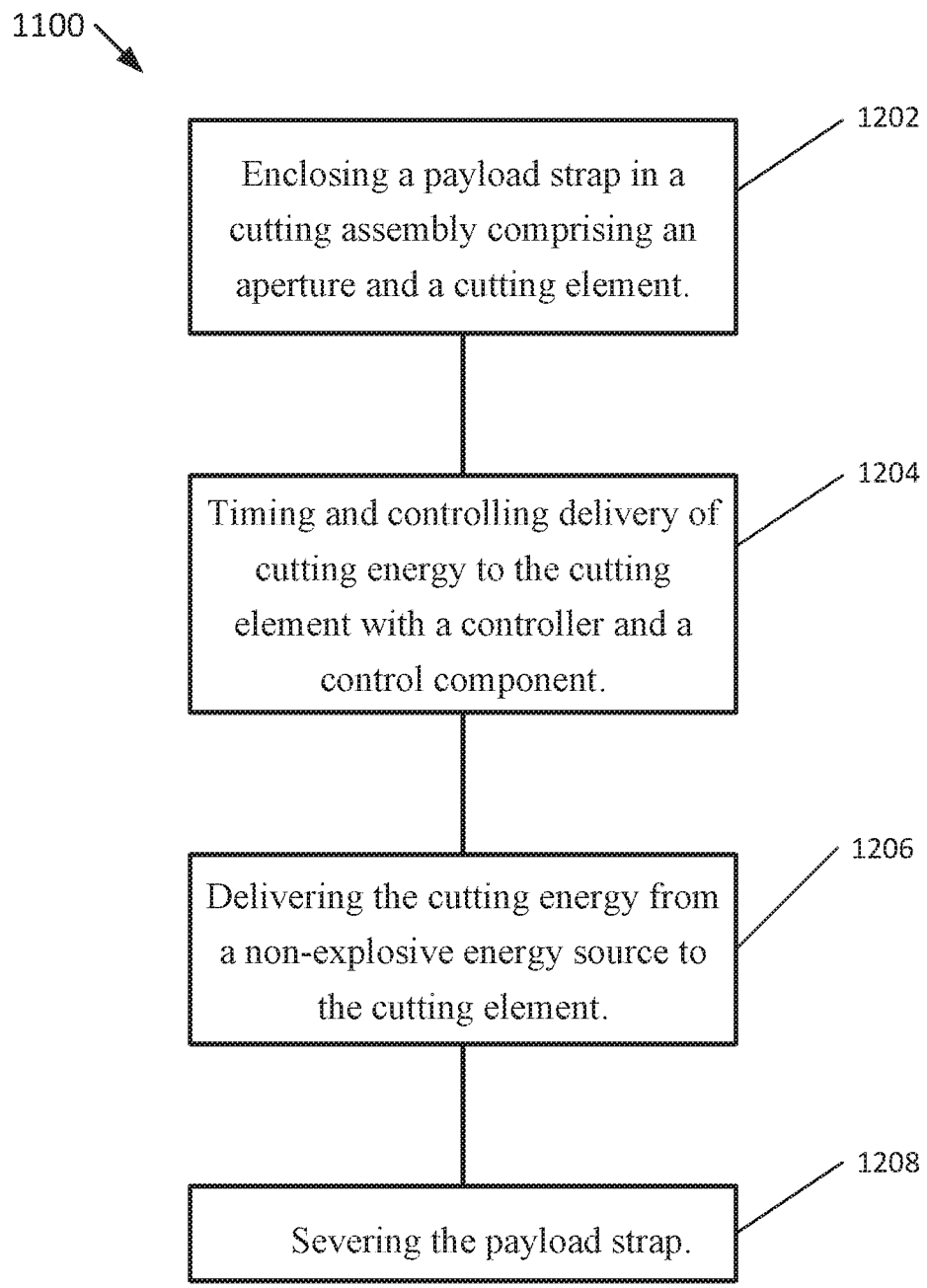
FIG. 12 is a flowchart illustrating a method according to the present disclosure.

FIG. 12 is a flowchart illustrating a method 1200 according to the present disclosure. Method 1200 begins at operation 1202, enclosing a payload strap (e.g., payload strap 206) in a cutting assembly comprising an aperture (e.g., aperture 203) and a cutting element (e.g., blade 204). Method 1200 continues with operation 1204, timing and controlling the delivery of cutting energy to the cutting element (e.g., blade 204) with a controller (e.g., controller 210) and a control element (e.g., any of switch 208, valve 504, pin ejector 601, pin puller 701). Method 1200 continues at operation 1206, delivering the cutting energy from a non-explosive energy source (e.g., thermal battery 207, spring 212 and gas cartridge 503) to the cutting element. Method 1200 concludes with operation 1208, severing the payload strap to release the payload.

The preceding description sets forth numerous specific details such as examples of specific systems, components, methods, and so forth, in order to provide a thorough understanding of several examples in the present disclosure. It will be apparent to one skilled in the art that at least some examples in the present disclosure may be practiced without these specific details. In other instances, well-known components or methods are not described in detail or are presented in simple block diagram form in order to avoid unnecessarily obscuring the present disclosure. Thus, the specific details set forth are merely exemplary. While this specification contains many specific implementation details, these should not be construed as limitations on the scope of the disclosure or of what may be claimed, but rather as descriptions of features specific to particular examples. Certain features that are described in this specification in the context of separate examples can also be implemented in combination in a single example. Conversely, various features that are described in the context of a single example can also be implemented in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the examples described above should not be understood as requiring such separation in all examples. Particular examples may vary from these exemplary details and still be contemplated to be within the scope of the present disclosure.

Reference throughout this specification to "one example" or "an example" means that a particular feature, structure, or characteristic described in connection with the examples is included in at least one example. Thus, the appearances of the phrase "in one example" or "in an example" in various places throughout this specification are not necessarily all referring to the same example. In addition, the term "or" is intended to mean an inclusive "or" rather than an exclusive "or." In addition, the articles "a" and "an" as used in this application and the appended claims should generally be construed to mean "at least one" unless specified otherwise or clear from context to be directed to a singular form. Furthermore, the terms "first," "second," "third," etc., as used herein, are meant as labels to distinguish among different elements and may not necessarily have an ordinal meaning according to their numerical designation.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent or alternating manner.

The above description of illustrated implementations, including what is described in the Abstract, is not intended to be exhaustive or to limit the scope of the disclosure to the precise forms disclosed. While specific implementations and examples are described herein for illustrative purposes, various equivalent modifications are possible within the scope of the present disclosure, as those skilled in the relevant art will recognize.

Clause 1: An apparatus, comprising a cutting assembly comprising an aperture to enclose a payload strap and a cutting element to sever the payload strap; a non-explosive energy source to store cutting energy; a control component coupled to the energy source to release the cutting energy; and a controller coupled to the control component to time and control the delivery of the cutting energy to the cutting element.

Clause 2: The apparatus of clause 1, wherein the cutting element comprises a blade, the energy source comprises a thermal battery, and the control component comprises a switch coupled between the thermal battery and the blade, the apparatus further comprising a spring to preload the blade against the payload strap, wherein the controller is configured to time and control the switch to deliver heating current from the thermal battery to the cutting element to melt through the payload strap.

Clause 3: The apparatus of Clause 1 or 2, wherein the cutting element comprises a wire loop, the energy source comprises a thermal battery, and the control component comprises a switch coupled between the thermal battery and the wire loop, the apparatus further comprising a spring to preload the wire loop around the payload strap, wherein the controller is configured to time and control the switch to deliver heating current from the thermal battery to the cutting element to melt through the payload strap.

Clause 4: The apparatus of any of Clauses 1-3, wherein the cutting element comprises a blade coupled to a piston, the energy source comprises a cartridge of compressed gas, and the control component comprises a valve coupled between the cartridge and the piston, the apparatus further comprising a spring to bias the blade away from the payload strap, wherein the controller is configured to time and control the valve to release the compressed gas to drive the piston and the blade to cut the payload strap.

Clause 5: The apparatus of any of Clauses 1-4, wherein the cutting element comprises a blade, the energy source comprises a compressed spring, and the control component comprises a pin ejector, the apparatus further comprising a pin coupled to the pin ejector and to the blade, wherein the compressed spring is disposed around the pin between the blade and a body of the pin ejector, wherein the controller is configured to time and control an ejection of the pin to deliver the energy of the compressed spring to the blade to cut the payload strap.

Clause 6: The apparatus of any of Clauses 1-5, wherein the cutting element comprises a blade, the energy source comprises a compressed spring disposed between the blade and a bulkhead, and the control component comprises a pin puller, the apparatus further comprising a pin of the pin puller coupled to the blade, to restrain the blade against the stored energy of the compressed spring, wherein the controller is configured to time and control the pin puller to release the blade and to deliver the stored energy of the compressed spring to the cutting element to cut the payload strap.

Clause 7: The apparatus of any of Clauses 1-6, wherein the cutting element comprises a blade, the energy source comprises a thermal battery, and the control component comprises a switch coupled between the thermal battery and a phase change actuator configured to convert electrical energy from the thermal battery to mechanical energy, the apparatus further comprising a pin of the phase change actuator coupled with the blade, wherein the controller is configured to time and control a connection between the thermal battery and the phase change actuator with the switch, to eject the pin of the phase change actuator to cut the payload strap with the blade.

Clause 8: The apparatus of any of Clauses 1-7, further comprising a wireless transceiver to receive timing instructions for cutting the payload strap from a remote server, wherein the timing instructions are based on a current location, altitude and velocity of the payload, and a target location, altitude and velocity for deployment of the payload.

Clause 9: The apparatus of any of Clauses 1-8, further comprising a GPS receiver to detect a current location, altitude and velocity of the payload; and a wireless transceiver to transmit the current location, altitude and velocity of the payload and to receive a target location, altitude and velocity of the payload for deployment of the payload, wherein the controller is configured to cut the payload strap when the current location, altitude and velocity match the target location altitude and velocity with a predefined accuracy.

Clause 10: The apparatus of any of Clauses 1-9, wherein the target location, altitude and velocity are received from one of the payload aircraft, an observation aircraft, and a ground-based control and command center.

Clause 11: The apparatus of any of Clauses 1-10, wherein the timing and control function of the controller is manually activated by the removal of an activation pin attached to a drogue line, when the payload is ejected from the payload aircraft.

Clause 12: A method comprising enclosing a payload strap in a cutting assembly comprising an aperture and a cutting element; timing and controlling delivery of cutting energy to the cutting element with a controller and a control component; delivering the cutting energy from a non-explosive energy source to the cutting element; and severing the payload strap.

Clause 13: The method of Clause 12, wherein the cutting element comprises a blade, the energy source comprises a thermal battery, and the control component comprises a switch coupled between the thermal battery and the blade, the method further comprising preloading the blade against the payload strap with a spring; connecting the thermal battery to the blade with the switch under the control of the controller; and heating the blade with current from the thermal battery to melt through the payload strap.

Clause 14: The method of Clause 12 or 13, wherein the cutting element comprises a wire loop, the energy source comprises a thermal battery, and the control component comprises a switch coupled between thermal battery and the blade, the method further comprising pretensioning the wire loop around the payload strap with a spring; connecting the thermal battery to the wire loop with the switch under the control of the controller; and heating the wire loop with current from the thermal battery to melt through the payload strap.

Clause 15: The method of any of Clauses 12-14, wherein the cutting element comprises a blade coupled to a piston, the energy source comprises a cartridge of compressed gas coupled to the piston, and the control component comprises a valve coupled between the cartridge and the piston, the method further comprising biasing the blade away from the payload strap with a spring; opening the valve to release the gas from the cartridge under the control of the controller; and driving the piston and the blade with the released gas to cut the payload strap.

Clause 16: The method of any of Clauses 12-15, wherein the cutting element comprises a blade, the energy source comprises a compressed spring, and the control component comprises a pin ejector having a pin coupled to the blade, wherein the compressed spring is disposed around the pin between the blade and a body of the pin ejector, the method further comprising holding the blade against a force of the compressed spring with the pin ejector; and releasing the pin of the pin ejector under the control of the controller to deliver the energy of the compressed spring to the blade to cut the payload strap.

Clause 17: The method of any of Clauses 12-16, wherein the cutting element comprises a blade, the energy source comprises a compressed spring disposed between the blade and a bulkhead, and the control component comprises a pin puller, the method further comprising restraining the blade against the stored energy of the compressed spring with a pin of the pin puller; pulling the pin with the pin puller under the control of the controller to release the blade; and delivering the stored energy of the compressed spring to the cutting element to cut the payload strap.

Clause 18: The method of any of Clauses 12-17, wherein the cutting element comprises a blade, the energy source comprises a thermal battery, and the control component comprises a phase change actuator coupled with the thermal battery and the controller, the method further comprising connecting the thermal battery to the phase change actuator under the control of the controller to activate a phase change; ejecting a pin from the phase change actuator, wherein the pin is coupled to the blade; and cutting the payload strap with the blade.

Clause 19: The method of any of Clauses 12-18, further comprising receiving, at the controller, timing instructions from a transceiver coupled with the controller, wherein the timing instructions are based on a current location, altitude and velocity of the payload, and a projected location, altitude and velocity of the payload.

Clause 20: The method of any of Clauses 12-19, further comprising receiving, with a GPS receiver coupled with the controller, a current location, altitude and velocity of the payload; transmitting, with a transceiver coupled to the controller, the current location, altitude and velocity of the payload; receiving, with the transceiver, a target location, altitude and velocity of the payload for cutting the payload strap, wherein the target location, altitude and velocity are received from one of the payload aircraft, an observation aircraft, and a ground-based control and command center.

What is claimed is:

1. An apparatus, comprising:
    a cutting assembly comprising an aperture to enclose a payload strap and a cutting element to sever the payload strap;
    a non-explosive energy source to store cutting energy, the energy source comprising a thermal battery;
    a control component coupled to the energy source to release the cutting energy; and
    a controller coupled to the control component to time and control delivery of the cutting energy to the cutting element, including delivery of heating current from the thermal battery to the cutting element to melt through the payload strap.

2. The apparatus of claim 1, wherein the cutting element comprises a blade, and the control component comprises a switch coupled between the thermal battery and the blade, the apparatus further comprising:
    a spring to preload the blade against the payload strap, wherein the controller is configured to time and control the switch to deliver the heating current from the thermal battery to the cutting element to melt through the payload strap.

3. The apparatus of claim 2, wherein the cutting element comprises a wire loop.

4. The apparatus of claim 1, wherein the cutting element comprises a wire loop, and the control component comprises a switch coupled between the thermal battery and the wire loop, the apparatus further comprising:
    a spring to preload the wire loop around the payload strap, wherein the controller is configured to time and control the switch to deliver the heating current from the thermal battery to the cutting element to melt through the payload strap.

5. The apparatus of claim 1, further comprising a wireless transceiver to receive timing instructions for cutting the payload strap from a remote server, wherein the timing instructions are based on a current location, altitude, and velocity of the payload, and a target location, altitude, and velocity for deployment of the payload.

6. The apparatus of claim 1, further comprising:
    a GPS receiver to detect a current location, altitude, and velocity of the payload,
    a wireless transceiver to transmit the current location, altitude, and velocity of the payload and to receive a target location, altitude, and velocity of the payload for deployment of the payload, wherein the controller is configured to cut the payload strap based on the current location, altitude, and velocity.

7. The apparatus of claim 6, wherein the target location, altitude, and velocity are received from one or more of a payload aircraft, an observation aircraft, and a ground-based control and command center.

8. The apparatus of claim 6, wherein the controller is configured to cut the payload strap when the current location, altitude, and velocity match the target location altitude and velocity with a predefined accuracy.

9. The apparatus of claim 1, wherein a timing and control function of the controller is manually activated by the removal of an activation pin attached to a drogue line, when the payload is ejected from a payload aircraft.

10. The apparatus of claim 1, wherein the cutting element comprises a blade.

11. The apparatus of claim 1 further comprising:
    a GPS receiver configured to detect a current location, altitude, and velocity of the payload; and
    a wireless transceiver configured to:
        transmit the current location, altitude, and velocity of the payload and to receive a target location, altitude, and velocity of the payload for deployment of the payload; and
        receive timing instructions for cutting the payload strap from a remote server,
    wherein the timing instructions are based on the current location, altitude, and velocity of the payload, and the target location, altitude, and velocity for deployment of the payload,
    wherein the controller is configured to cut the payload strap based on the timing instructions.

12. A method, comprising:
    enclosing a payload strap in a cutting assembly comprising an aperture and a cutting element;
    timing and controlling delivery of cutting energy to the cutting element with a controller and a control component;
    delivering the cutting energy from a non-explosive energy source to the cutting element, the energy source comprising a thermal battery, wherein delivering the cutting energy includes delivering heating current from the thermal battery to the cutting element to melt through the payload strap; and
    severing the payload strap.

13. The method of claim 12, wherein the cutting element comprises a blade and the control component comprises a switch coupled between the thermal battery and the blade, the method further comprising:
    preloading the blade against the payload strap with a spring;
    connecting the thermal battery to the blade with the switch under the control of the controller; and
    heating the blade with the heating current from the thermal battery to melt through the payload strap.

14. The method of claim 12, wherein the cutting element comprises a wire loop and the control component comprises a switch coupled between thermal battery and the blade, the method further comprising:
- pretensioning the wire loop around the payload strap with a spring;
- connecting the thermal battery to the wire loop with the switch under the control of the controller; and
- heating the wire loop with the heating current from the thermal battery to melt through the payload strap.

15. The method of claim 12, further comprising:
- receiving, at the controller, timing instructions from a transceiver coupled with the controller, wherein the timing instructions are based on a current location, altitude, and velocity of the payload, and a target location, altitude, and velocity of the payload.

16. The method of claim 15, wherein the method further comprises cutting the payload strap based on the current location, altitude, and velocity.

17. The method of claim 16, wherein the method further comprises cutting the payload strap when the current location, altitude, and velocity matches the target location, altitude, and velocity.

18. The method of claim 12, further comprising:
- receiving, with a GPS receiver coupled with the controller, a current location, altitude, and velocity of the payload;
- transmitting, with a transceiver coupled to the controller, the current location, altitude, and velocity of the payload; and
- receiving, with the transceiver, a target location, altitude, and velocity of the payload for cutting the payload strap, wherein the target location, altitude, and velocity are received from one of the payload aircraft, an observation aircraft, and a ground-based control and command center.

19. The method of claim 12, wherein the cutting element comprises a blade.

20. The method of claim 12, wherein the cutting element comprises a wire loop.

* * * * *